Feb. 8, 1966 D. B. JAMES ETAL 3,234,545

INFORMATION PROCESSING CIRCUIT

Filed Feb. 8, 1962 2 Sheets-Sheet 1

INVENTORS D. B. JAMES
R. A. KAENEL
BY Lucian C. Canepa
ATTORNEY

Feb. 8, 1966 D. B. JAMES ETAL 3,234,545

INFORMATION PROCESSING CIRCUIT

Filed Feb. 8, 1962 2 Sheets-Sheet 2

INVENTORS: D. B. JAMES
R. A. KAENEL
BY Lucian C. Canepa
ATTORNEY 3,234,545
INFORMATION PROCESSING CIRCUIT Dennis B. James, Bernardsville, and Reginald A. Kaenel, Murray Hill, N.J., assignors to Bell Telephone Laboratories, Incorporated, New York, N.Y., a corporation of New York Filed Feb. 8, 1962, Ser. No. 171,894
2 Claims. (Cl. 340—347)

Figure 1:
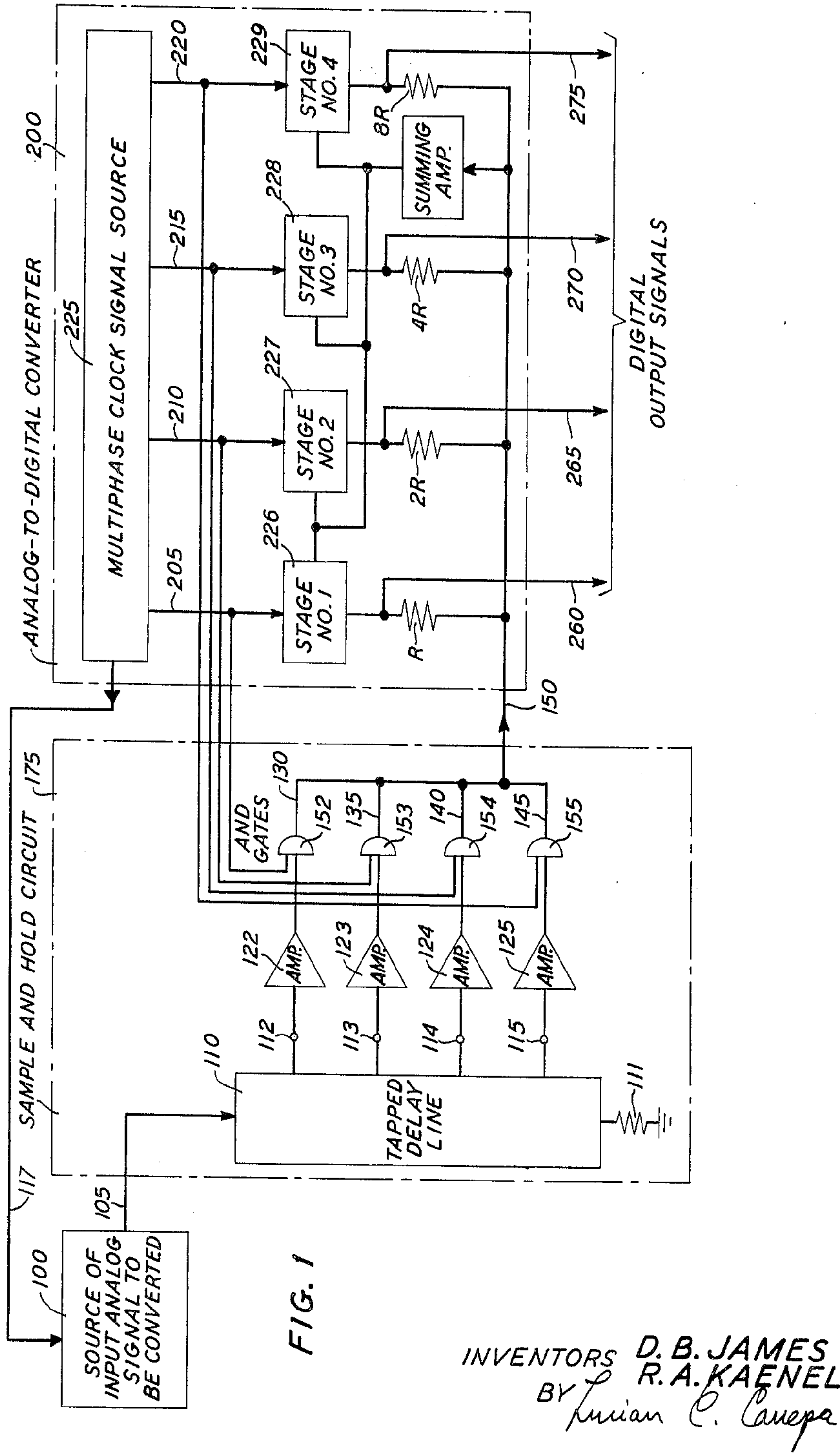

This invention relates to the processing of electrical information signals, and more particularly to a sample and hold circuit arrangement for applying an input analog signal to an analog-to-digital converter.

In converting a continuously variable input signal into a digital representation by means of an $n$-digit analog-to-digital converter of the digit-by-digit decision type, it is necessary that each of a plurality of preselected portions of the input signal be maintained at the input to the converter for a sufficient length of time to permit the $n$ digit decisions thereof to be made. The arrangement that is typically employed for this purpose is aptly termed a sample and hold circuit.

An object of the present invention is an improved information processing circuit. More specifically, an object of this invention is an improved sample and hold circuit.

Another object of the present invention is a sample and hold circuit that is characterized by extreme simplicity of design and high reliability.

These and other objects of the present invention are realized in a specific illustrative embodiment thereof that comprises an $n$-tap delay line to one end of which is coupled an analog signal that is to be applied to a converter to be encoded into a digital representation. A plurality of gates are respectively connected to the taps of the line and are enabled in sequence by $n$ timing signals that sequentially energize the stages of the converter.

The illustrative circuit is arranged such that a particular selected portion of the input analog signal is applied to the converter from the first tap of the line in time coincidence with the energization of the most significant digit stage of the converter. Subsequently, the same selected portion of the input signal appears at the second tap of the delay line. This signal is gated from the second tap by the second timing signal and is applied to the input of the converter during the energization time of the second or next less significant digit stage thereof.

The desired overall operation of the illustrative sample and hold circuit is achieved by making the signal propagation time between adjacent taps equal to the time interval that exists between the leading edges of adjacent timing signals. In this way each stage of the converter has applied thereto during the time of its energization the same selected portion of the input analog signal, whereby the final output representation of the converter is a digital indication of the amplitude of the selected portion.

It is a feature of the present invention that a sample and hold circuit include a tapped delay line to one end of which is coupled an analog signal that is to be applied to a sequential analog-to-digital converter.

It is a further feature of this invention that a plurality of gate circuits be respectively connected to the taps of the delay line and that the gates be enabled in sequence by timing signals that sequentially energize the stages of the converter.

It is a still further feature of the present invention that the signal propagation time between adjacent taps of the delay line be equal to the time between the leading edges of adjacent converter timing signals.

Figure 2:
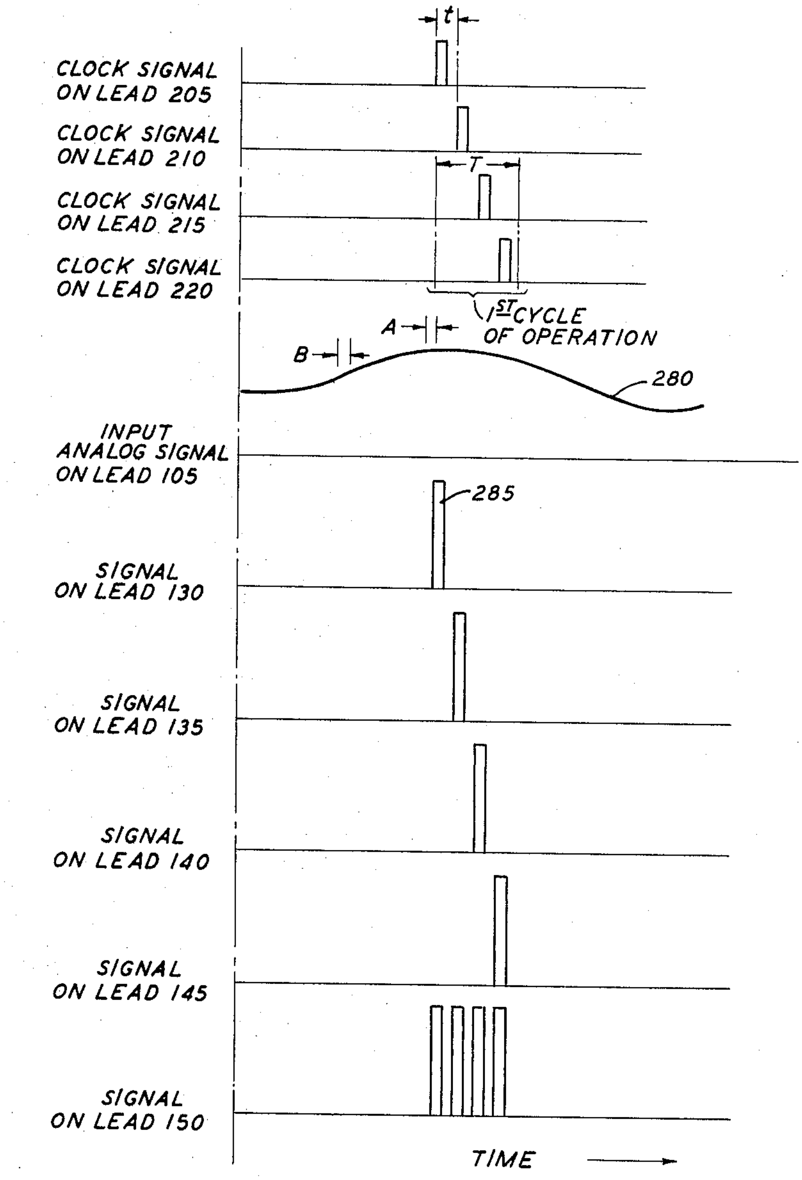

A complete understanding of the present invention and of the above and other features and advantages thereof may be gained from a consideration of the following detailed description of an illustrative embodiment thereof presented hereinbelow in connection with the accompanying drawing, in which:

FIG. 1 depicts a specific illustrative sample and hold circuit made in accordance with the principles of the present invention in association with a sequential analog-to-digital converter; and FIG. 2 depicts various waveforms which are helpful in understanding the mode of operation of the system illustrated in FIG. 1.

Referring now to FIG. 1, there is shown a source 100 for supplying an analog signal which is to be converted into a corresponding digital representation by a four-stage analog-to-digital converter 200. The digital output signals provided by the converter 200 appear on leads 260, 265, 270, and 275. The nature of the output waveform from the analog source 100 is depicted in FIG. 2 and is identified there by reference numeral 280.

As indicated in FIG. 1, a sample and hold circuit 175 interconnects the analog source 100 and the analog-to-digital converter 200. The circuit 175 is a specific illustrative embodiment of the principles of the present invention and functions to maintain the amplitude of each of a plurality of preselected portions of the input analog signal essentially constant during the energization time of each of the stages of the converter 200. As a result, each stage has applied thereto during its period of energization the same selected portion of the input analog signal, whereby the output indication of the converter during each complete cycle of operation thereof is a digital word representative of the amplitude of the selected portion.

Illustratively, the analog-to-digital converter 200 shown in FIG. 1 is of the digit-by-digit decision type. Such a converter typically operates in a synchronous manner under the control of a multiphase clock signal source that respectively provides $n$ sequential clock or energization signals to $n$ different circuit points of the converter. In response to these signals the converter sequentially performs and stores the results of $n$ amplitude comparison or digit decision operations. This general type of converter is well known in the art. An improved version of such a converter is disclosed in a copending application of D. B. James, Serial No. 55,898, filed September 14, 1960, now Patent 3,087,150 issued April 23, 1963. Accordingly, the converter 200 depicted in a general way in FIG. 1 may advantageously be considered to be a converter of the novel and improved type disclosed in detail in the above-cited James application.

The converter 200 shown in FIG. 1 includes a multiphase clock signal source 225 that supplies clock or energization signals to the four stages 226, 227, 228, and 229 thereof, one at a time in the listed order. In response to these four signals the converter 200 undergoes a complete cycle of operation and, as a result, provides on the output leads 260, 265, 270, and 275 a four-digit binary code word representative of the particular portion of the input analog signal that was applied to each of the stages during the cycle. It is noted that the source 225 may also be arranged to supply reset signals to the stages of the converter preparatory to the commencement of another complete cycle of operation thereof.

The waveforms of the clock or timing signals that appear in sequence on output leads 205, 210, 215, and 220 of the multiphase source 225 are depicted in the top four rows of FIG. 2. As indicated there, $t$ seconds elapse between the leading edges of adjacent timing signals. Also indicated there is the fact that a period of T seconds is required to respectively apply the four sequential timing signals to the stages 226, 227, 228, and 229 of the converter 200. Hence, if the converter 200 is arranged to be capable of performing four digit decision operations in a total time of no more than T seconds, $1/T$ can be regarded for illustrative purposes as the maximum number of selected portions of the input analog signal which can be converted per second into respective digital indications. It is, of course, well known that if $1/T$ times per second is chosen to be slightly higher than twice the highest frequency present in the analog signal, the resulting digital indications will contain all of the information present in the original analog signal.

The analog signal supplied by the source 100 shown in FIG. 1 is coupled via a lead 105 to the input end of a conventional tapped delay line 110 which is included in the sample and hold circuit 175. The other end of the line 110 is connected to ground via a terminating resistor 111 whose value is chosen in accordance with well known principles to minimize the occurrence of signal reflections from the bottom end of the line 110 back toward the input end thereof. The line 110 includes four tap points 112, 113, 114, and 115. More generally, the line includes $n$ taps, where $n$ is the number of stages inluded in the converter to which the sample and hold circuit 175 is connected. To avoid distortion in the overall conversion process, the bandwidth of the line 110 should be at least as great as that of the signals supplied by the analog source 100.

The positions of the taps 112, 113, 114, and 115 on the delay line 110 are chosen such that the time required for a signal to propagate along the line from one tap to the adjacent one is $t$ seconds which, as noted above, is also the time between the leading edges of adjacent clock signals supplied by the source 225.

Connected to the tap points 112, 113, 114, and 115 of the line 110 are amplifiers 122, 123, 124, and 125, respectively. These amplifiers serve to minimize the loading on the line 110 and, in addition, are arranged to compensate for any attenuation introduced by the line to analog signals propagated therealong. In turn, the outputs of the noted amplifiers are applied to two-input AND gates 152, 153, 154, and 155. The other input to the AND gate 152 is the clock signal that is also applied to stage No. 1 in the converter 200. Hence, in approximate time coincidence with the energization of the first stage 226, the analog signal appearing at tap 112 is applied via the amplifier 122 to the AND gate 152 and is gated therethrough by the noted clock signal. The resulting signal waveform 285 applied to the converter via leads 130 and 159 during the energization of the stage 226 is shown in FIG. 2. It is noted that it is the portion A of the input analog signal waveform 280 which appears at the tap 112 during the period in which the AND gate 152 is enabled by the clock signal applied to the stage 226. Furthermore, it is noted that the relative timing between the energization of the first stage 226 and the appearance of the analog signal at tap 112 is controlled by a signal applied from the multiphase clock signal source 225 via a lead 117 to the input analog source 100.

As emphasized above, the period $t$ of the clock signals is equal to the time required for the analog signal to propagate from the tap 112 to the tap 113. Hence, during the time in which the stage 227 of the converter 200 is energized by the second clock signal, the selected portion A of the input analog waveform 280 appears at the second tap 113. This portion of the analog signal is applied via the amplifier 123 and the enabled AND gate 153 to the converter 200. As a result, the portion of the analog signal applied to the converter during the energization of the stage 227 is exactly the same as the portion that was applied to the converter during the energization of stage 226, namely, the portion A. In an exactly similar manner it can be shown that the portion A is also applied to the converter 200 during the energization of each of the stages 228 and 229. Hence, the resulting waveform which is applied to the input of the converter 200 during its first complete cycle of operation comprises four identical pulses, as represented by the bottommost waveform of FIG. 2. It is noted that during the next complete cycle of operation of the converter 200, the portion marked B on the waveform 280 of FIG. 2 is applied by the sample and hold circuit 175 to each of the stages 226, 227, 228, and 229 of the converter 200.

In summary, the configuration and mode of operation of the specific illustrative sample and hold circuit 175 depicted in FIG. 1 have been described in detail above. As is evident from the description, the holding function of the circuit 175 is performed by the tapped delay line 110. In addition, it is evident that the sampling action of the circuit 175 is directly controlled by the output of the multiphase clock signal source 225, for whatever portion of the input analog signal appears at tap 112 during the time in which a clock signal is applied via lead 205 to stage 226 becomes the selected signal portion that is converted into a digital representation. Hence, the choice of which particular portions of the input signal are to be converted is simply a matter of selectively controlling the time of occurrence of the first one of each set of $n$ timing signals provided by the source 225.

It is to be understood that although particular attention herein has been directed to a sample and hold circuit associated with a four-stage analog-to-digital converter of the digit-by-digit decision type, the principles of the present invention may be employed in a sample and hold circuit that is to apply input signals to any sequential $n$-stage converter in which sequential timing signals are available.

Furthermore, it is to be understood that the above described arrangements are only illustrative of the application of the principles of the present invention. Numerous other arrangements may be devised by those skilled in the art without departing from the spirit and scope of this invention. For example, although the description above has specified a tapped delay line, it is to be understood that any delay instrumentality from time-spaced points of which the input analog signal may be abstracted is within the scope of the principles of this invention.

What is claimed is:

1. In combination in a sample and hold circuit, substantially nonreflecting delay line means including $n$ taps and a terminating impedance at one end thereof to minimize signal reflections, means for applying a continously variable analog input signal to the other end of said delay line means, said $n$ taps being so positioned along said delay line means that the time required for the input signal to propagate between adjacent taps is $t$ seconds, $n$ gate means respectively connected to said taps, each of said gate means including an output terminal, and means distinct from said delay line means for enabling said $n$ gate means in sequence by respectively supplying thereto $n$ enabling signals whose period is $t$ seconds, whereby a particular selected portion of the applied analog input signal appears in sequence at the successive taps of said delay line means and also appears at the respective output terminals of said $n$ gate means in time coincidence with the occurrence of said enabling signals.

2. A combination as in claim 1 further including an $n$-stage sequential analog-to-digital converter, each stage thereof being associated with a different one of the taps of said delay line means, means connected to the output terminals of said gate means for supplying an input signal to said converter, and means responsive to said enabling signals for sequentially energizing said stages in respective unison with the enabling of the gate means connected to the respective associated taps.

References Cited by the Examiner

UNITED STATES PATENTS

| | | | |
|---|---|---|---|
| 2,570,221 | 10/1951 | Earp et al. | 340—347 X |
| 2,888,647 | 5/1959 | Beter et al. | 340—347 X |
| 2,922,151 | 1/1960 | Reiling | 340—347 |
| 3,035,258 | 5/1962 | Chasek | 340—347 |
| 3,087,150 | 4/1963 | James | 340—347 |
| 3,105,197 | 9/1963 | Aiken | 333—70 |

MALCOLM A. MORRISON, *Primary Examiner.*